Figure 1:
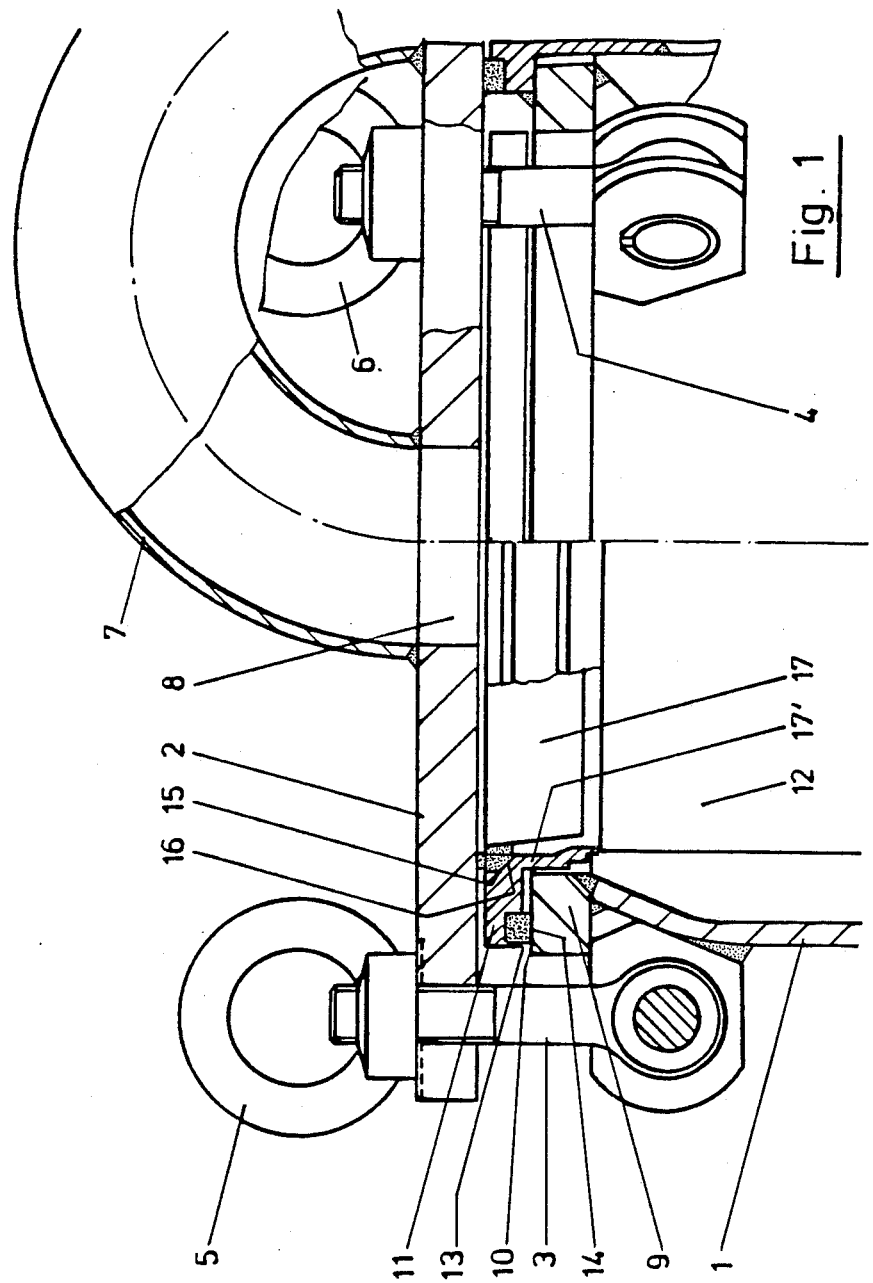

United States Patent [19]

Kierdorf et al.

[11] Patent Number: 4,948,504
[45] Date of Patent: Aug. 14, 1990

[54] FILTER BAG CARRIER WITH FILTER SEAL PROFILE

[75] Inventors: Frank M. Kierdorf, Cologne; Rainer G. Behnke, Heppendorf, both of Fed. Rep. of Germany

[73] Assignee: GAF Chemicals Corporation, Wayne, N.J.

[21] Appl. No.: 327,278

[22] Filed: Mar. 22, 1989

[51] Int. Cl.⁵ ............................................. B01D 29/10
[52] U.S. Cl. ................................. 210/238; 210/445; 210/450; 210/452; 210/453; 210/455; 210/470; 210/484; 55/373; 55/378; 55/502; 55/503
[58] Field of Search ............... 210/232, 237, 238, 435, 210/440, 443, 444, 445, 448, 450, 451, 452, 453, 454, 455, 470, 471, 484, 485, 488; 55/362, 373, 378, 379, 502, 503

[56] References Cited

U.S. PATENT DOCUMENTS

| | | | |
|---|---|---|---|
| 3,640,392 | 2/1972 | Smith | 210/445 |
| 3,771,664 | 11/1973 | Schrink et al. | 210/445 |
| 3,774,769 | 11/1973 | Smith | 210/445 |
| 4,419,240 | 12/1983 | Rosaen | 210/470 |
| 4,460,468 | 7/1984 | Morgan | 210/445 |
| 4,669,167 | 6/1987 | Asterlin | 210/232 |

Primary Examiner—W. Gary Jones
Assistant Examiner—Wanda L. Millard
Attorney, Agent, or Firm—Marilyn J. Maue; Joshua J. Ward

[57] ABSTRACT

A filter for a fluid under pressure comprising a container including a filter vessel (1) and cover (2) for clamping against the filter vessel. A support basket (12) adapted to be inserted into the filter vessel includes a flange (11) having an inwardly and upwardly open profile (15, 16). A filter sealing element (18) of an annular filter bag carrier (17) may be inserted into the open profile (15). In order to obtain a complete sealing effect, particularly against the passage of the unfiltered fluid into the filtered fluid in the filter, an upwardly and outwardly open groove (19) is provided in the profiled filter sealing element (18), which groove receives an inner O ring (20).

7 Claims, 3 Drawing Sheets

FILTER BAG CARRIER WITH FILTER SEAL PROFILE

The invention relates to a filter for a fluid under pressure as in accordance with the preamble of claim 1.

In such a prior art filter, the flange carrying the filter basket simultaneously serves as sealing flange and as support flange for the filter bag (U.S. Pat. No. 3,640,392). To this end, the flange comprises two channels concentric relative to each other one of which is upwardly open towards the cover of the vessel and the other is downwardly open towards the flange. In the two channels concentrically disposed relative to each other, two O rings are provided which are separated from each other by an annular zone of the flange. In addition, the flange includes, between the inner channel and an inwardly lateral wall, an approximately L-shaped groove as an inwardly and upwardly open profile. Into the L-shaped groove, a bead may be nested at the upper side of the filter bag. The bead constitutes a filter sealing element having a round cross section if unloaded. When closing the cover, the bead, or this filter sealing element, respectively, sealingly presses against the lower portion of the L-shaped groove and the lower portion of the cover. By so doing, a sealing is obtained in addition to the mechanical fixation of the filter bag, which will avoid the overflow of the unfiltered fluid conducted into the filter bag over the upper filter bag edge and thus a by-passing of the filter material into the space between filter bag and filter basket. It has however turned out that this aim has not necessarily been reached in all cases. Moreover, the whole system for sealing the interior of the filter bag is relatively complicated since three sealing elements in total are pressed together between the cover and the flange of the supporting basket while no excessive or non-uniform tensioning of the elements should occur. The prior art also comprises filter bags, which are provided instead of with the upper bead, circular in diameter, forming the sealing element, with a collar or a seam into which a flexible hoop of approximately rectangular cross-section is sewn in (German Patent Specification No. 1,611,043). On cannot, however, see how the sealing between the inner area of the filter bag and its outer area can thereby be improved.

This is also true in the case of a further filter bag known in practice, the upper open end of which is encompassed by a profiled plastic ring tapering downwardly in steps. Particularly with a view to axial production tolerances, it is feared that leakages between the interior area of this filter bag and its outer area may occur or that, plastic deformation of the filter sealing element may occur when closing the cover of the filter.

It is therefore the aim of the present invention to provide, together with an uncomplicated easy-to-manufacture shape of the filter, a filter bag seal which excludes with great security a pass-over of the unfiltered fluid into the fluid already filtered.

In accordance with the present invention, a filter for a fluid under pressure is provided which comprises a container including a filter vessel as well as a cover for clamping against said filter vessel, including a support basket adapted to be inserted into said filter vessel, said support basket having an annular flange (11) adapted to be clamped between said cover and said filter vessel, said flange having an inwardly and upwardly open profile into which a profiled filter sealing element (18) of an annular filter bag carrier (17) may adaptingly be inserted, said profiled filter sealing element (18) comprising an upwardly and outwardly open grove (19) into which an inner O ring (20) may be inserted.

In the filter of the present invention it is not only the filter sealing element provided at the upper portion of the filter bag carrier or the filter bag, which is of significance for the seal between the inner area of the filter bag and its outer area, particularly also within the vessel, but also an O ring inserted into the groove of the filter element. To this end, the groove is in a particular way made upwardly and outwardly open so that in case of a deformation of the O ring by pressing the cover onto the O ring inserted into the filter sealing element, the O ring not only rests against the bottom side of the cover but is also laterally squeezed out from the groove in order to axially exactly align with the support basket. The O ring should in comparison to the groove in the filter sealing element be dimensioned such that a squeezing effect occurs. Of significance is a double sealing effect of the O ring inserted into the groove of the filter element, viz. the sealing of the filter housing, on the inner side of the cover, towards the outside, and the sealing between the filtered fluid and the fluid not yet filtered in the filter vessel.

An additional advantage as compared with the prior art apparatus is seen in that an O ring and a corresponding groove on the upper side of the flange of the support basket may be omitted so that the manufacture is implified and the flange of the support basket may be dimensioned with a smaller outer diameter. When clamping the cover shut, the O ring inserted into the groove of the filter element, forms a particularly reliable sealing since the clamping pressure is not reduced for the force component which the cover otherwise would exert onto a further sealing element on the upper side of the flange of the support basket as would be the case with prior art apparatus. In other words, the pressure of the cover acts exclusively onto the O ring in the groove of the filter sealing element.

As already described above, the annular flange of the support basket may be so designed that it includes, in addition to the inwardly and upwardly open profile, which receives the filter sealing element of the filter bag or the filter bag carrier, only one concentric groove which is downwardly open, and receives a second O ring sealing to the filter vessel when the cover is clamped shut.

In a preferred embodiment of the invention, the filter sealing element of the filter bag carrier preferably has an approximately downwardly-reaching truncated-cone shaped portion to which a filter bag is secured. The attachment of the filter bag to the filter bag carrier may be performed in various ways, for instance by gluing, clamping, molding of the filter bag or by welding.

For an easy removal of the filter bag from the support basket, handles are advantageously provided on the filter bag carrier such that for exchanging the filter bag, the handles may conveniently be gripped from above.

Figure 2:
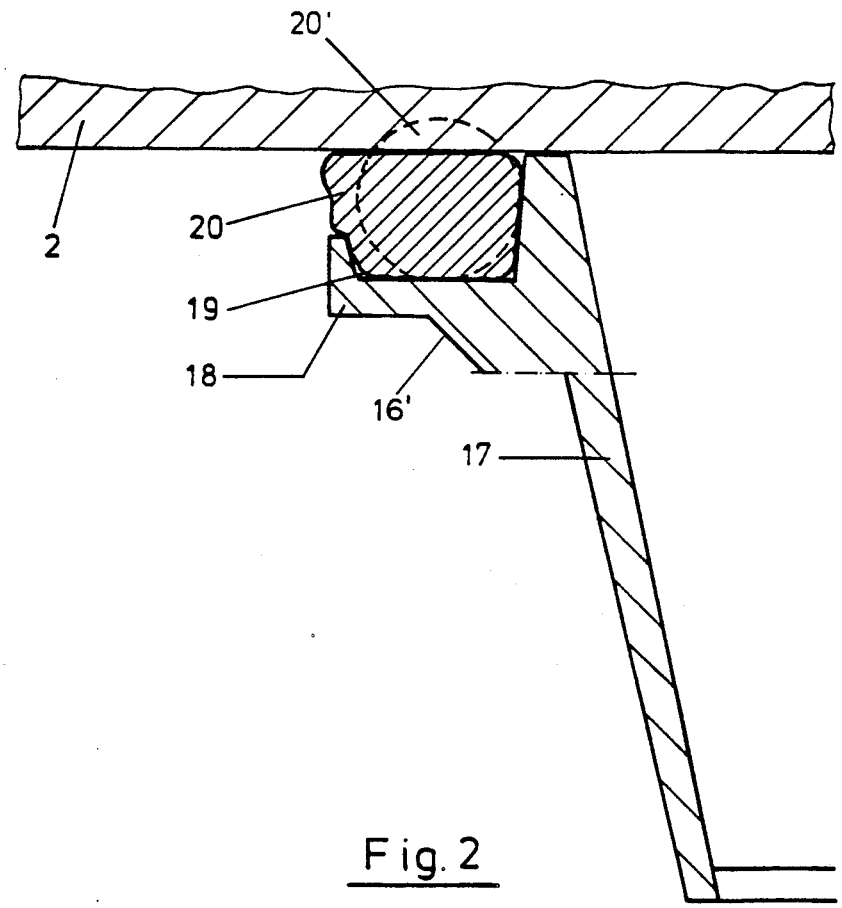
Figure 3:
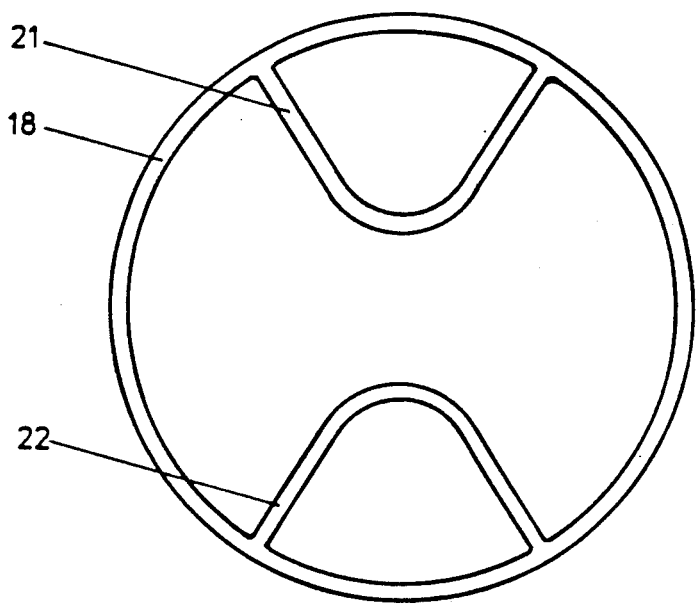

In the following, an embodiment of the invention will be explained in connection with a drawing including three figures, wherein FIG. 1 is a section through the upper portion of the filter, which is developed as a pressure filter, FIG. 2 is a detail of the filter according to FIG. 1, also in section, namely through the filter sealing element of the annular filter bag carrier, and FIG. 3 is a top view on the filter sealing element demonstrating the location of the handles.

In FIG. 1, a filter substantially embodied as a welded structure is shown, in sections, comprising a hollow approximately cylindrical vessel 1, of which one wall portion of a filter vessel is to be seen. At the lower section not shown, the vessel may converge to become an outlet opening. On top, the vessel is closed by a cover 2, which is pressed in the direction towards the vessel by clamps welded along the circumference in the proximity to the upper edge of the vessel, clamps 3 and 4 are shown, and bar heads 5 and 6 are shown. The cover includes a curved supply duct 7 for the fluid under pressure to be filtered, which leads to at least one passage opening 8 into the cover.

An outwardly extending annular flange 9 is welded to the upper edge of vessel 1 which flange 9 supports a further annular flange 11 of a support basket 12. To this end, flange 11 of the support basket includes, on its lower side, a circumferential annular groove 13 into which an O ring 14 is inserted. This O ring exerts, under the contact pressure exerted particularly by cover 2 on it, a sealing function, which hinders the unfiltered fluid in vessel 1 from the exit to the outside. On its inner side, flange 11 of the support basket is provided with an inwardly and upwardly open profile, which includes of an approximately L-shaped groove 15 and a downwardly-reaching portion 16. The flange of the support basket is prolonged by a downwardly-extending side wall 17', to which the support basket is secured, which is approximately cylindrical in its upper section and downwardly truncated-cone shaped at the lower end. (The lower section of the support basket is not shown in FIG. 1).

A filter bag, not shown in the drawing, may be inserted into the support basket and may be secured, by gluing, clamping, welding or molding, to a filter element carrier 17 including a filter sealing element 18 provided at the upper edge.

As shown in FIG. 2, the filter sealing element 18 has at its outer side a stepped profile which fits into L-shaped groove 15 and at its lower portion a chamfered profile $16^1$ which fits against the downwardly-reaching portion 16 of flange 11 as shown in FIG. 1. As FIG. 2 further shows, the filter sealing element as the upper section of filter element carrier 17, integrally passes into the latter. In filter sealing element 18, an upwardly and outwardly open groove 19 is provided, which receives an inner O ring 20 consisting of rubber or a soft plastic material. The cross section, round in the unloaded state, is shown by a dashed line at 20'. The shape of O ring 20 shown by a solid line results from a deformation when clamping cover 2. O ring 20 does not only deform at its upper side which faces cover 2 but is also laterally somewhat squeezed out from the open groove so that it presses against the section perpendicular in FIG. 1 of the L-shaped groove in flange 11 of support basket 12 and thus exerts a centering and a safe sealing function against the passage of the unfiltered fluid from the interior of the filter bag and of the filter element carrier into the outer area within vessel 1, wherein filtered fluid only should be found. From an axial and radial squeezing of the O ring, therefore, there results a double sealing function, that is, in addition to the above-described sealing between the areas of the non-filtered fluids and the filtered fluids, a sealing of the interior of the vessel 1 against the outside as a whole. This sealing function need be supplemented on the underside of flange 11 of support basket 12 only by outer O ring 14, which is concentrically arranged relative to the inner O ring 20 as described above. In other words, flange 11 of the support basket is clamped between flange 9 of vessel 1 and the cover over outer O ring 14 and inner O ring 20 as well as filter sealing element 18. For the sealing functions as described, further sealing elements are neither necessary nor desirable.

The filter is made functionally in that the filter bag together with filter element carrier 17 and filter sealing element 18 is inserted into the support basket so that filter sealing element 18 rests, in the way described, in L-shaped groove 15 of flange 11 of the support basket. After the insertion of the filter bag with the support basket into vessel 1, cover 2 is closed and by turning bar heads 5, 6 is pressed onto inner O ring 20 whereby outer O ring 14 is simultaneously deformed under the pressure. For removing the filter bag from the filter, one proceeds in the reverse sequence whereby the filter bag may simply be withdrawn form the support basket by means of handles 21, 22 provided on filter sealing element 18. Handles 21, 22 are shown in FIG. 3, which constitutes a strongly simplified illustration of filter sealing element 18 without any details of the profile.

We claim:

1. Filter apparatus for a fluid under pressure comprising in combination a container including a filter vessel as well as a cover for clamping against said filter vessel, a support basket inserted into said filter vessel, said support basket having an annular flange (11) adapted to be clamped between said cover and said filter vessel, said flange having an inwardly and upwardly open profile into which a profiled filter sealing element (18) of an annular filter bag carrier (17) is adaptingly inserted therein, said profiled filter sealing element (18) comprising an upwardly and outwardly open groove (19) into which an inner O ring (20) may be inserted.

2. Filter according to claim 1, in which said annular flange (11) of said support basket (12) includes a concentric groove (13), which is downwardly open and receives an outer O ring (14) sealingly resting against said filter vessel.

3. Filter according to claim 1, wherein said filter sealing element (18) of said filter bag carrier (17) has an approximately truncated-cone shaped, downwardly-reaching portion to which a filter bag is secured.

4. Filter according to one of claims 1 through 3, wherein said filter bag carrier further comprises handles (21, 22) to be gripped from above.

5. Filter according to claim 1 in which the sealing element (18) further comprises at its outer side a stepped profile adapted to fit into the inwardly and upwardly open profile (15) of the flange (11).

6. Filter according to either of claims 1 or 2, in which the inwardly and upwardly open profile (15) of the flange (11) comprises an L-shaped groove and the outer profile of the sealing element (18) includes an L-shaped portion adapted to fit into said L-shaped groove.

7. Filter according to claim 1 in which the open groove (19) and O ring (20) are sized so that, upon clamping closed the cover (2), the O ring is pressed into sealing engagement with both the cover (2) and the open profile (15) of the flange (11).

* * * * *